United States Patent [19]

Bowen et al.

[11] 4,360,927
[45] Nov. 23, 1982

[54] REPEATER TRUNKING SYSTEM

[75] Inventors: William A. Bowen; James W. Williams, both of Lynchburg, Va.

[73] Assignee: General Electric Company, Lynchburg, Va.

[21] Appl. No.: 129,645

[22] Filed: Mar. 12, 1979

[51] Int. Cl.³ .................. H04B 7/14; H04B 1/00; H04B 1/44
[52] U.S. Cl. .................. 455/17; 455/32; 455/34; 455/54; 455/78
[58] Field of Search ............... 455/7, 8, 15, 17, 32-34, 455/54, 77, 78; 179/2 EB, 2 E; 370/24, 32

[56] References Cited

U.S. PATENT DOCUMENTS

| | | |
|---|---|---|
| 3,173,966 | 3/1965 | Rypinski . |
| 3,376,509 | 4/1968 | Wilcox et al. . |
| 3,535,636 | 10/1970 | Muilwijk ..................... 455/32 |
| 3,555,424 | 1/1971 | Malm . |
| 3,707,679 | 12/1972 | Bruley et al. . |
| 3,808,537 | 4/1974 | Sarati et al. . |
| 4,009,442 | 2/1977 | Bromssen . |
| 4,013,958 | 3/1977 | Spayth . |
| 4,125,808 | 11/1978 | Graham . |
| 4,129,749 | 12/1978 | Goldman . |

FOREIGN PATENT DOCUMENTS

| | | |
|---|---|---|
| 2030347 | 9/1978 | Fed. Rep. of Germany ........ 455/32 |
| 850698 | 10/1960 | United Kingdom . |
| 1145899 | 3/1969 | United Kingdom . |
| 1175130 | 12/1969 | United Kingdom . |
| 1185789 | 3/1970 | United Kingdom . |
| 1276941 | 6/1972 | United Kingdom . |
| 1297071 | 11/1972 | United Kingdom . |

*Primary Examiner*—Jin F. Ng
*Attorney, Agent, or Firm*—Cushman, Darby & Cushman

[57] ABSTRACT

Arrangement for establishing communication between a first mobile radio station and a second mobile radio station through a repeater over a radio frequency channel selected from a plurality of such channels. In an idle mode, a mobile station searches the channels for a predetermined group signal identifying it as belonging to a particular group of mobile stations. When that predetermined group signal is received on a channel, the mobile station is enabled on that channel so that it can communicate with a call originating mobile station belonging to the same group. In a call originate mode, a mobile station searches for an idle or unused channel identified by the absence of a busy signal. When an idle channel is found, the call originating station transmits a busy signal. The repeater, hearing the busy signal, transmits an acquisition signal. This acquisition signal is detected by the call originating mobile station which thereafter transmits a predetermined group signal for enabling other mobile stations in the common group on that same channel.

30 Claims, 12 Drawing Figures

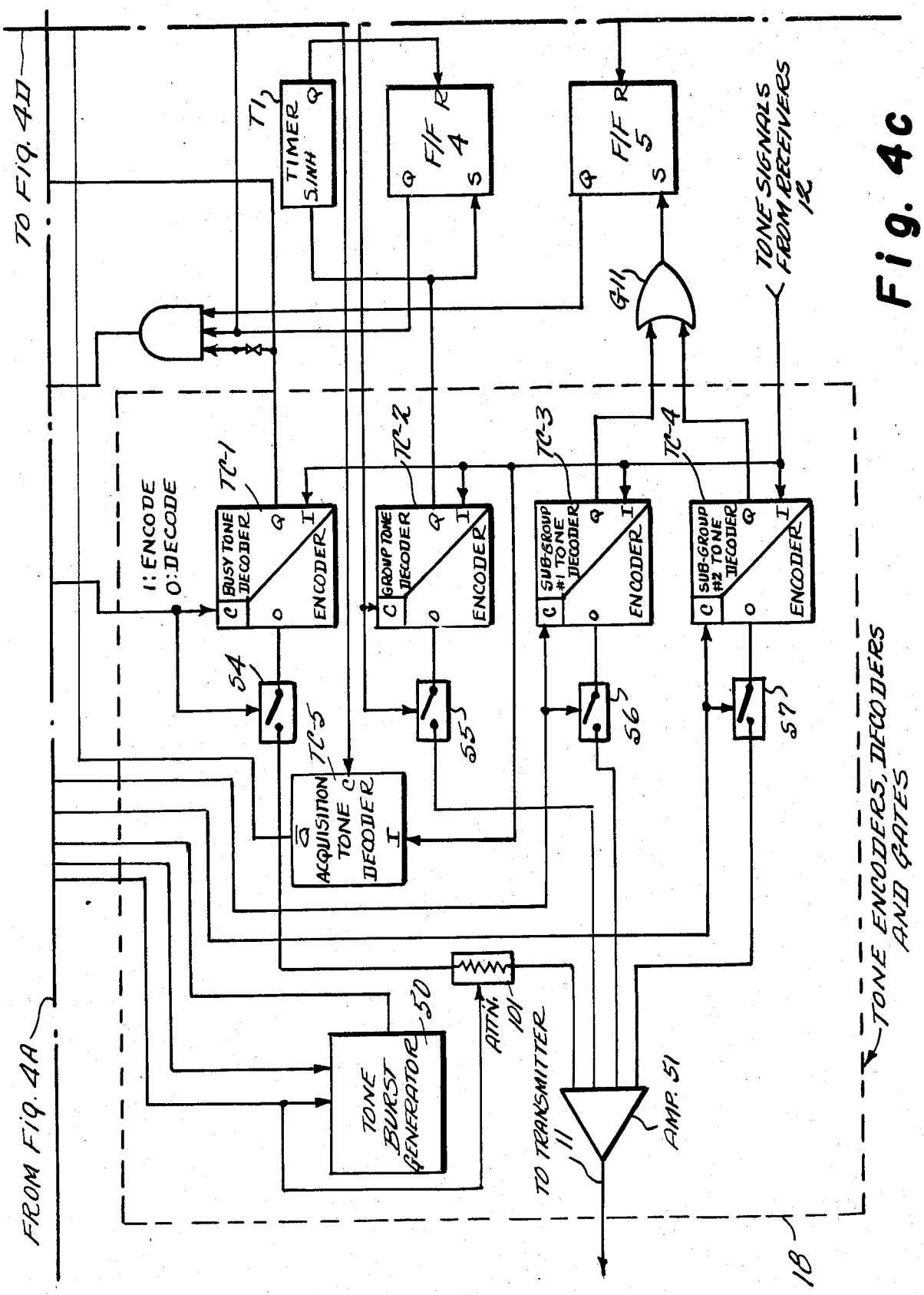

REPEATER TRUNKING SYSTEM

BACKGROUND OF THE INVENTION

This invention relates generally to radio repeater systems. More specifically this invention pertains to systems wherein a plurality of mobile or portable stations communicate with one another over several communications channels through repeaters operating on each of such channels. Even more specifically, this invention is directed to arrangements for establishing communication between a first radio station and a second radio station through a repeater and over a radio channel selected from a plurality of such channels.

In many localities, a plurality of land mobile radio frequency channels are allocated for communication among vehicles. Generally, there may be, and usually are, many more vehicles having mobile radio stations than there are available radio channels in a given locality. Each of these radio channels usually includes at least two separate and distinct frequencies, one for transmitting and the other for receiving.

Consequently, some arrangement is needed for enabling a mobile vehicle user to obtain access to a radio channel that is not in use and to thereafter establish communication with another mobile vehicle user over that radio frequency channel.

One such system is disclosed by J. C. Berti et al in U.S. patent application Ser. No. 956,085 filed Oct. 30, 1978 and entitled IMPROVED ARRANGEMENT AND METHOD FOR ESTABLISHING RADIO COMMUNICATION IN A SYSTEM, now abandoned in favor of continuing application Ser. No. 110,995, filed Jan. 10, 1980 by Berti et al, now abandoned. In the Berti system, each mobile or portable radio station (including a transmitter and receiver) can be placed in an idle or call originate mode. When a mobile station is placed in the call originate mode, its receiver scans all of the allocated radio frequency channels in the system until an unused channel is found. When an unused channel is found, the station's transmitter and receiver become operable on that channel. The mobile station's transmitter sends a busy signal to the repeater operating on the unused channel. The repeater receives this busy signal and transmits a busy signal identical to the busy signal receiver. When the mobile station that sent the busy signal receives it back from the repeater, it sends out a group signal identifying a particular subset of mobile or portable radio stations with which the user desires to communicate. The group signal is re-transmitted by the repeater and is recognized by each radio station within that subset and they are activated on the channel selected by the busy tone exchange.

In the idle mode, the receiver of each mobile or portable station in the system scans all of the allocated radio frequency channels for its predetermined group signal. When the receiver detects its predetermined group tone or tones on a channel, it stops scanning, and enables the transmitter and receiver on that channel for communication through the repeater with the station originating the call. There may be a plurality of such stations associated with a predetermined group tone or tones.

The Berti system works well under most circumstances. However, under certain circumstances, a mobile radio station can erroneously lock onto a channel that is non-vacant. When a mobile station is placed in the call originate mode, it scans all of the channels for the presence of a busy signal. If this scanning takes place during a fade situation or when for any other reason the busy signal detector of the call originating station has failed to detect the busy tone, the call originating station may lock onto a channel that is non-vacant and it will begin to operate on that channel.

SUMMARY OF THE INVENTION

Therefore the present invention provides an arrangement for more reliably establishing communication among mobile radio stations through a repeater. Utilizing the arrangement according to the present invention, a lock onto a non-vacant channel is much less likely to occur than when using previous arrangements.

The arrangement according to the present invention provides for a positive "handshake" between a mobile station originating a call and the repeater on a vacant channel.

In the present arrangement, a mobile station placed in the call originate mode searches the available channels sequentially until an idle one is found on which no busy marking signal or tone is detected. The mobile station stops scanning on the vacant unmarked channel and transmits a busy signal which is normally used to mark a busy channel. The repeater, upon detecting the busy signal transmitted by the mobile station, transmits an acquisition signal having different characteristics from the busy signal. This acquisition signal is transmitted only if the channel is, in fact, vacant. The call originating mobile station only after detecting acquisition tone from the repeater will complete the signalling sequence by transmitting a group signal identifying the particular mobile stations with which the user would like to communicate, a sub-group signal, if subgroups are used and a busy signal. Thus, there is provided a positive indication by the presence of an acquisition signal rather than merely by the lack of a busy signal to define a vacant channel in the call originate sequence of signalling.

BRIEF DESCRIPTION OF THE DRAWINGS

Many of the attendant advantages of the present invention will be readily apparent as the invention becomes better understood by reference to the following detailed description with the appended claims, when considered in conjunction with the accompanying drawings, wherein:

DETAILED DESCRIPTION OF THE PREFERRED EMBODIMENT

Figure 1:
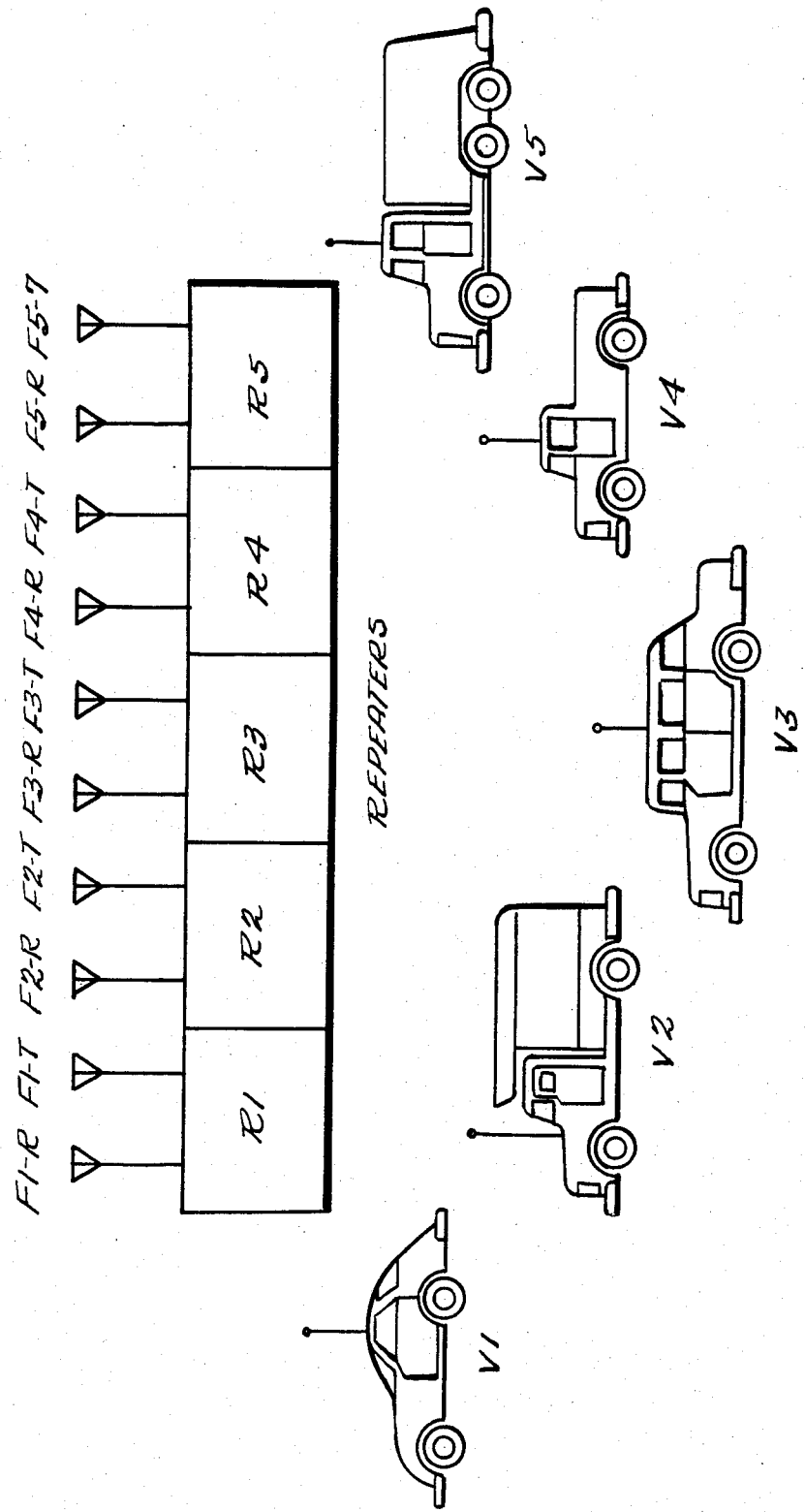
FIG. 1 is a pictorial diagram of a typical land mobile communication system for which the arrangement of the present invention is intended.

Referring now to the figures wherein like reference numerals designate like or corresponding parts throughout, and specifically referring to FIG. 1, there is shown a pictorial diagram of a typical mobile communication system for which the present invention is intended. It is assumed that a particular geographic locality has been allocated five radio repeater communication channels (for example in bands around 850 Megahertz), each such channel having a different transmitting and receiving frequencies. For five channels, five repeaters R1 through R5 are provided and located at an available site that provides optimum coverage. Each of repeaters R1 through R5 includes a transmitter, a receiver, a transmitting antenna, and a receiving antenna.

For simplex operation, in the first repeater, R1, the receiver and receiving antenna function on a frequency F1-R, and the transmitter and transmitting antenna function on a frequency F1-T which is removed from frequency F1-R by a sufficient amount to provide good frequency separation from the transmitter and receiver. Other frequencies F2-R and F2-T through F5-R and F5-T are provided for repeaters R2 through R5 respectively.

In the same locality, different groups of users may utilize the repeaters with the radio transmitters and receivers in their mobile vehicles V1 through V5, for example. Typically, each group has a common basis, such as the vehicles in a given business, for example taxi cabs or a fleet of oil delivery trucks. The number of groups which a repeater can serve depends, among other things, upon the number of vehicles in a group, the amount of time a radio channel is used, and the number of repeater channels available. For example, five repeaters (each including a transmitter and receiver) operating on a channel different from the other repeaters can serve as many as two thousand vehicles. However, the number of vehicles which can be efficiently served may change depending upon the demand for the channels.

If there are a number of repeater channels available in a given locality, it is desirable that a group of vehicles be able to quickly ascertain which channel or frequencies are available, so as to establish communication with the other vehicles in that same group. The present invention provides an arrangement and method for providing and establishing this communication in a relatively simple but highly reliable fashion.

Figure 2:
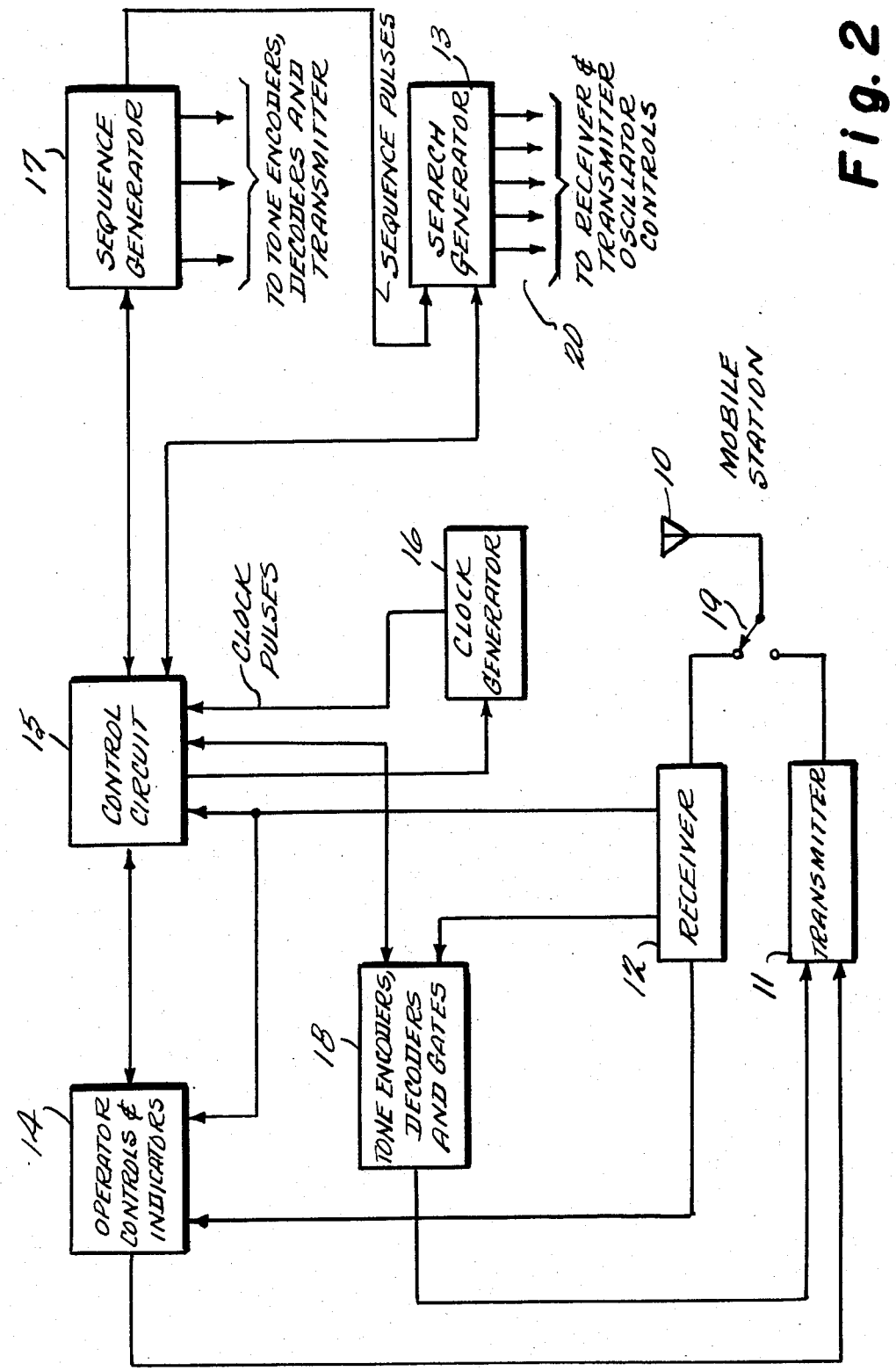
FIG. 2 is a general block diagram of the repeater trunking system according to the present invention.

FIG. 2 is a general block diagram of the repeater trunking system according to the present invention for use in a mobile station, such as in a vehicle. It is assumed that the vehicle is one of a group of vehicles V1 through V5, shown in FIG. 1. The mobile radio station in the vehicle includes a radio transmitter 11 capable of operating on any of the frequencies F1-R through F5-R, and a radio receiver 12 capable of operating on any of the frequencies F1-T through F5-T. Two frequencies are needed for each channel in order that the mobile station and the repeater can function in a simplex or push-to-talk arrangement. Thus, the mobile station would transmit on a repeater receive frequency (for example F1-R). The signal on frequency F1-R would be received by the repeater and transmitted to the other vehicles on frequency F1-T. The other vehicles in the group would receive the signal on repeater frequency F1-T. When transmitting, the other vehicles would transmit on frequency F1-R. In such an arrangement, a single antenna 10 is switched by a relay 19 between the vehicular or mobile transmitter 11 and receiver 12, depending upon whether the mobile station is transmitting or receiving.

Full duplex operation could be provided by using these same two frequencies, but with separate receive and transmit injection, a duplexer, and separate antennas. Or, full duplex operation could be provided by specifying four separate and distinct frequencies within each channel and for the repeater associated with that channel. It is assumed in this presently preferred, nonlimitative, exemplary embodiment that transmitter 11 and receiver 12 are frequency modulation devices, although they may be amplitude modulation devices.

Transmitter 11 includes an oscillator circuit (not shown) which operates at one of five transmit frequencies depending upon the signal applied to it by a search generator 13. Receiver 12 is preferably of the superheterodyne type and includes a local oscillator which also operates at a frequency corresponding to one of five frequencies depending upon the signal supplied by the search generator 13. Clock signals are provided by a clock generator 16. Search generator 13 is supplied with clock signals which cause it to sequentially produce frequency scanning signals at each of five outputs 20. These scanning signals are applied to the transmitter and receiver oscillators to cause transmitter 11 to be sequentially operable on radio frequencies F1-R through F5-R, and receiver 12 to be sequentially operable on the radio frequencies F1-T through F5-T. Tone encoders, decoders, and gates 18 are provided for decoding or filtering tones received by receiver 12 and for encoding or producing tones to be gated and transmitted by transmitter 11.

The mobile station includes operator controls and indicators 14 to enable the user to operate his station and to have indications of the status of his station. The user controls permit the operator to place his station in the call originate mode to establish communication with another vehicle in the same group, or to place his station in the idle or scanning mode so that he will receive communications from other mobile stations in the same group.

A control circuit 15 supplies clock signals from clock generator 16 to a sequence generator 17 when the operator controls place the station in the call originate mode, or to search generator 13 when the operator controls place the station in the idle mode.

In the call originate mode, control circuit 15 supplies clock pulses to the sequence generator 17 to cause the sequence generator to produce signals which provide the following sequence of functions: first, locating an idle channel; second, transmitting a busy signal, suitably an audio tone of a predetermined frequency to the repeater to acquire and enable or activate the repeater transmitter and receiver on the idle channel; third, stopping transmission and causing the receiver to listen for an acquisition signal from the repeater; fourth, transmitting a group signal, suitably an audio tone of a predetermined frequency different from the frequency of the busy signal to identify other mobile stations within a predetermined group; fifth, transmitting a subgroup signal, suitably an audio tone having a frequency different from both the busy signal and group signal, if the stations in a given group are further subdivided into subgroups; sixth, stopping transmitting and causing the mobile station's receiver to listen and ascertain whether the repeater is sending out a transmission with a busy signal on the selected channel; and seventh repeating the sequence on all available channels if the repeater transmitter was not enabled or activated in the second function or if an acquisition signal was not received. If the repeater transmitter was activated, then indications are provided to the operator that he has acquired and activated a repeater, and that his station and the repeater are in a ready mode for operation.

In the idle mode, control circuit 15 supplies clock pulses to search generator 13 to cause the search generator to produce signals for changing the frequency of the transmitter and receiver oscillators. This causes the receiver 12 to sequentially tune to each of the five frequencies on which repeaters can transmit and, at the same time, causes transmitter 11 to sequentially tune to each of the five companion or associated frequencies on which the repeaters can receive. If the group signal for that particular mobile station is not detected on a channel, search generator 13 causes the receiver and transmitter of that mobile station to tune to the next channel frequency. This sequence of events continues as long as receiver 12 is operable, and stops only when it receives a busy signal, its predetermined group signal, and its subgroup signal if utilized. If the group signal and subgroup signal (if used) are received, control circuit 15 provides an indication to the user that he is being called. The user can then pick up his handset or microphone and communicate with the calling station.

Figure 3:
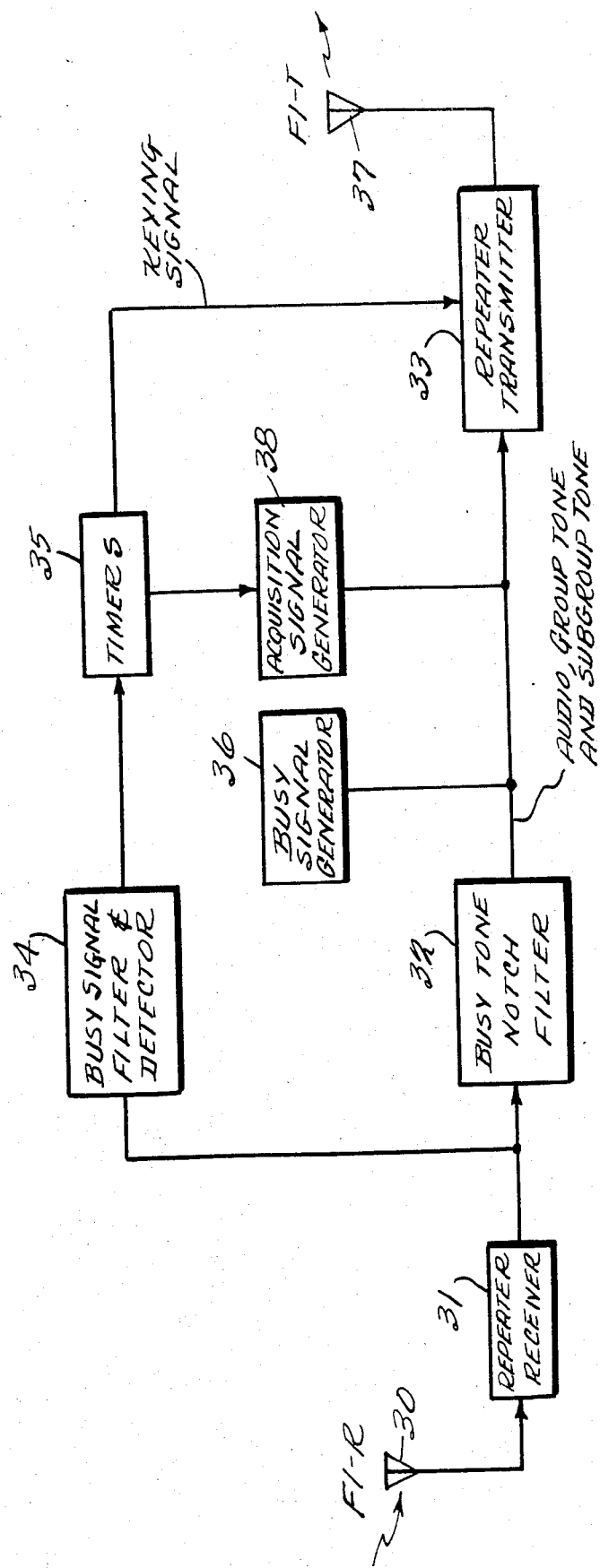
FIG. 3 shows a block diagram of a repeater station.
Figure 4A:
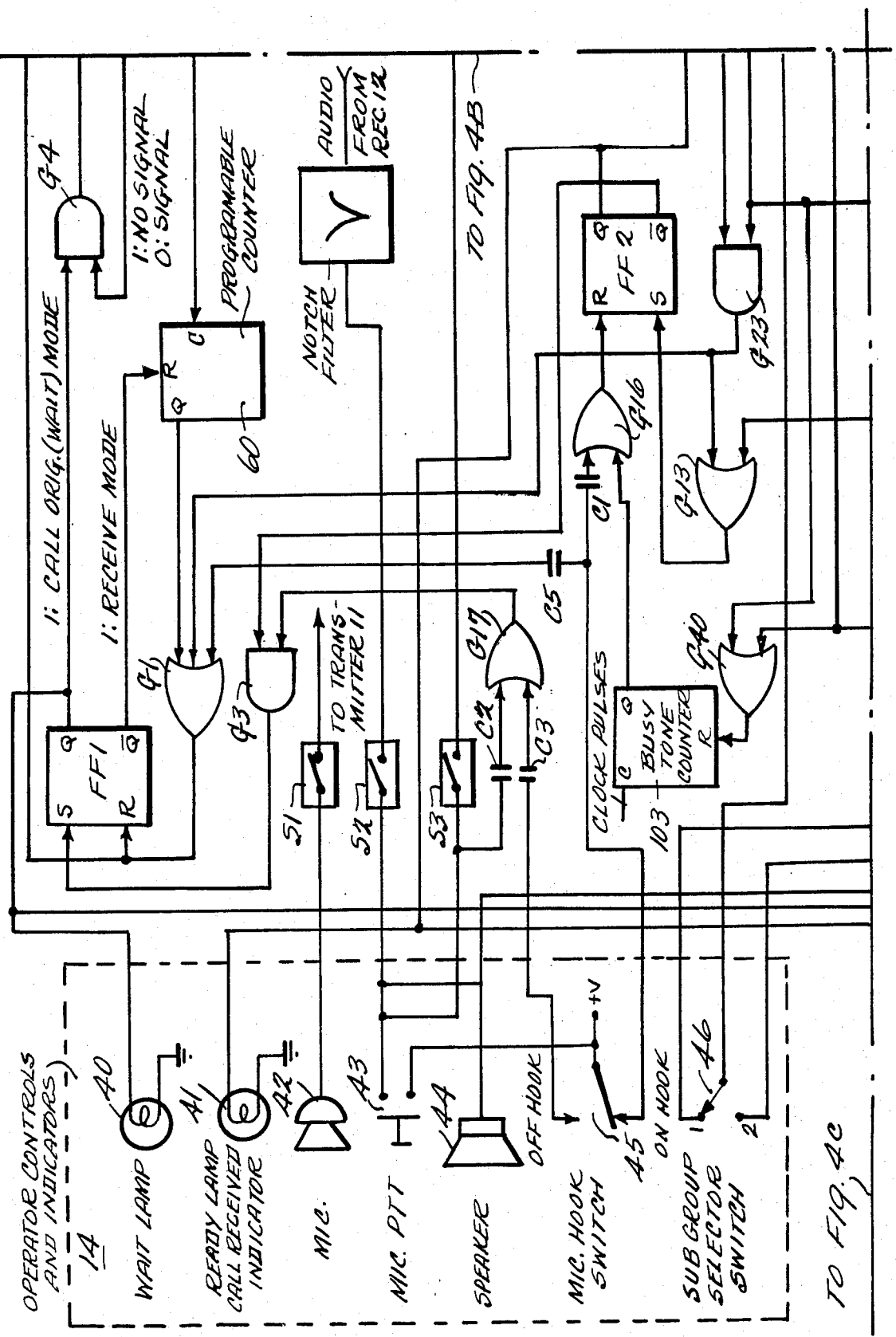
FIG. 4 (FIGS. 4A through 4D) sets forth a schematic diagram of that portion of the present invention located at a mobile station.
Figure 4B:
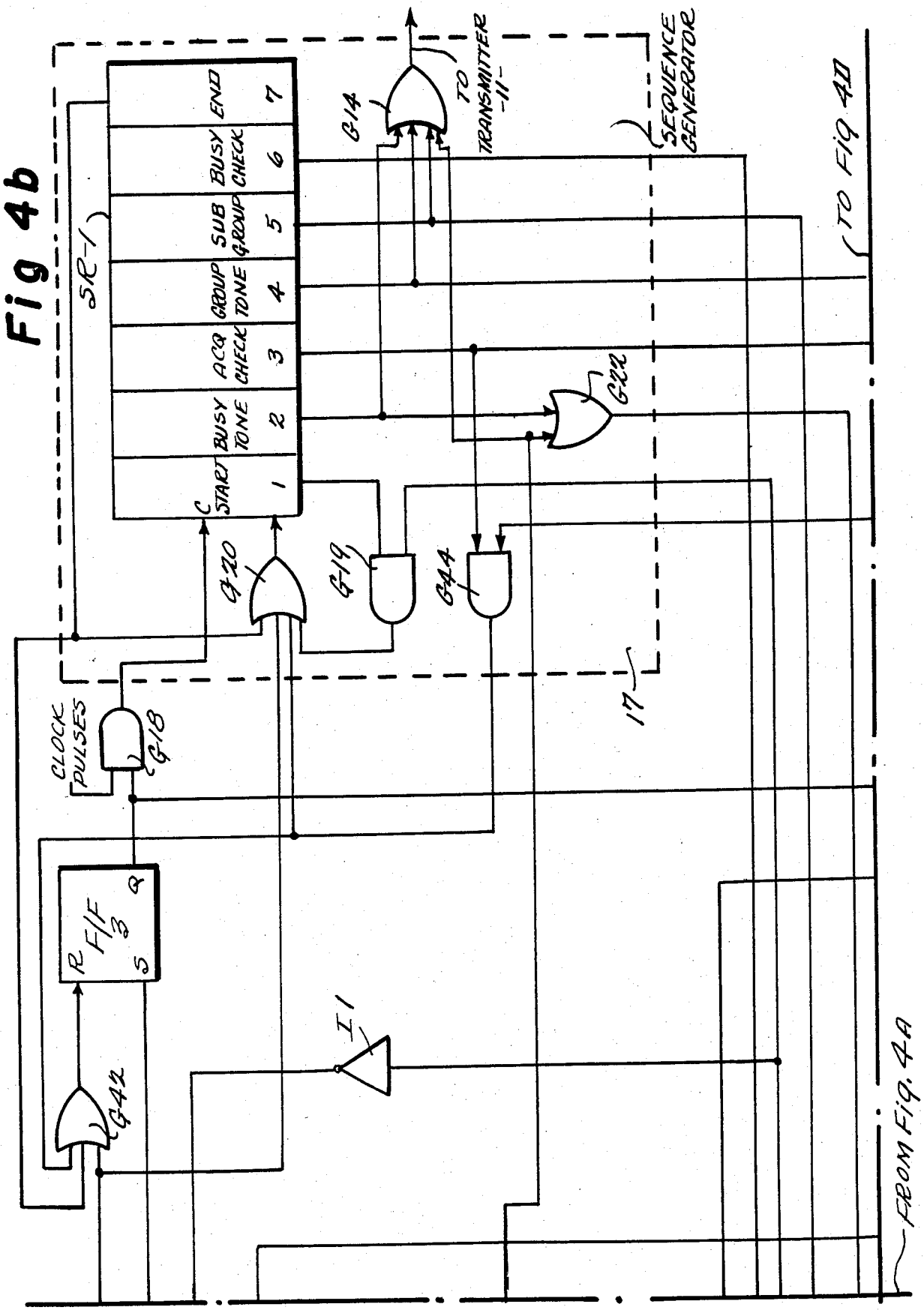
Figure 4D:
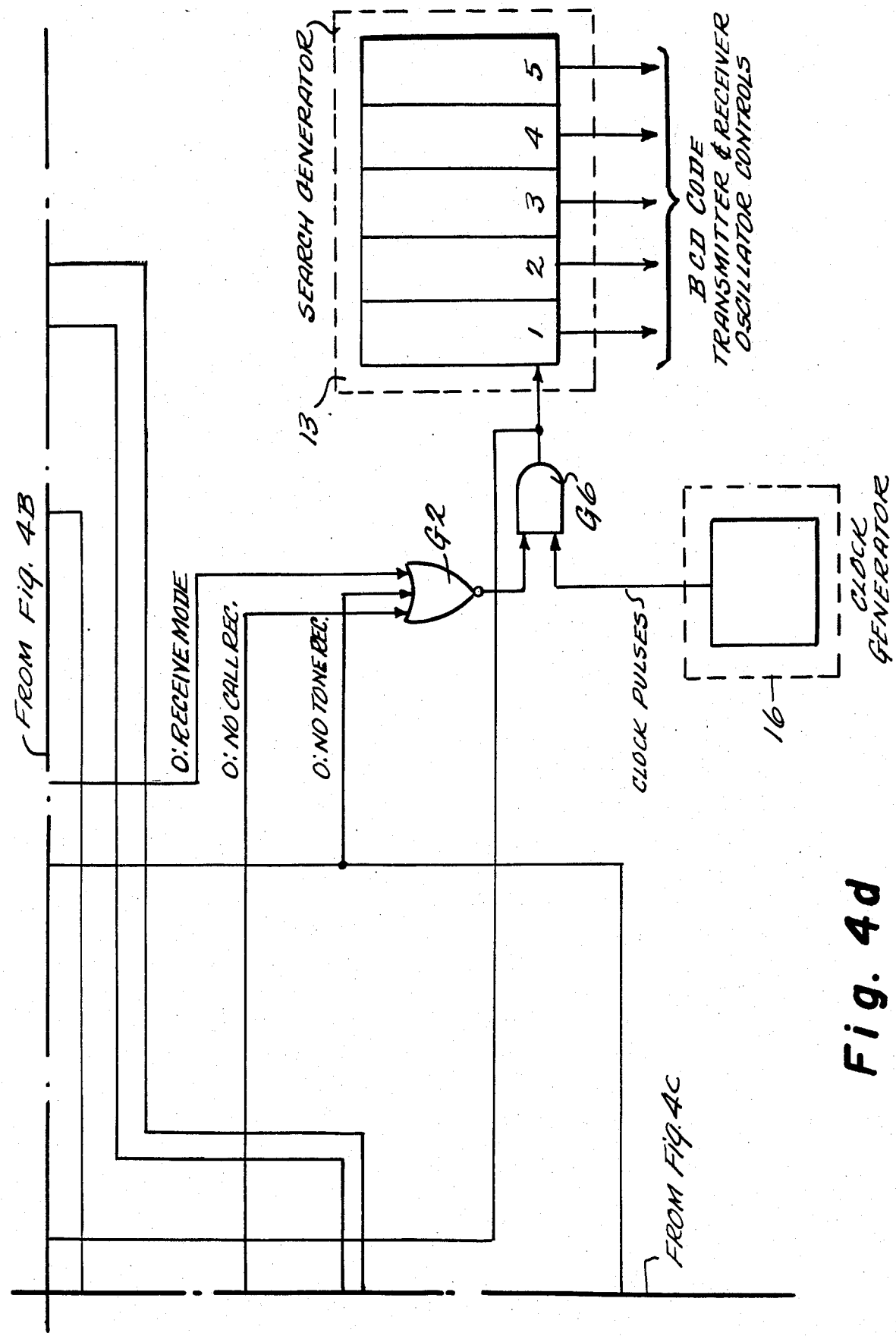

FIG. 3 is a block diagram of one of the repeaters shown in FIG. 1 for use with the trunking system according to the present invention. In this repeater, an antenna 30 is connected to a repeater receiver 31 for receiving a particular frequency, for example F1-R. The output of repeater receiver 31 is coupled to a busy signal notch filter 32 which filters out or rejects the busy signal, but applies the received audio signals, group signal, and subgroup signal to a repeater transmitter 33. Repeater transmitter 33 is coupled to an antenna 37 for transmitting on a companion channel frequency F1-T. The companion channel frequencies F1-R, F1-T are separated sufficient for proper circuit operation. It is possible to operate repeater receiver 31 and repeater transmitter 33 on the same antenna, or to operate all of the repeaters on the same antenna if proper coupling and matching networks are used.

The output of repeater receiver 31 is also applied to a busy signal bandpass filter and detector 34 which detects only the busy signal frequency and applies the busy signal detection signal to a timer 35. Timer 35 produces an enabling or keying signal at the beginning of and as long as a busy signal is detected, and for a selected period (for example 10 seconds) after termination of the busy signal. This enabling or keying signal turns on or enables repeater transmitter 33. When the enabling signal ends, repeater transmitter 33 is turned off automatically without the need for an idle signal. This feature prevents repeater transmitter 33 from being erroneously keyed or enabled in the absence of a busy signal. Timer 35 also permits a repeater to become available to another subsequent group if transmissions by the acquiring group do not occur within a predetermined span of time, for example, every 10 seconds. Timer 35 generates a window for the transmission of an acquisition signal to the call originating mobile station.

The repeater also includes a busy signal generator 36 and an acquisition signal generator 38, the outputs of which are coupled to the input of repeater transmitter 33 along with the audio and subgroup signal.

It is preferred that the busy signal be regenerated at the repeater so as to insure that the mobile stations are kept in operative condition even though there is momentary absence (for example a few seconds less than 10) of any mobile station transmission. However, the group and subgroup signals are re-transmitted by repeater transmitter 33 as detected by repeater receiver 31 from the mobile transmitter. Each of the individual blocks of FIG. 3 are known in the art, so that a more detailed description of them is not believed to be necessary. Each of the repeaters shown in FIG. 1 is similar to the exemplary repeater shown in FIG. 3, but operates at different frequencies.

Figure 5:
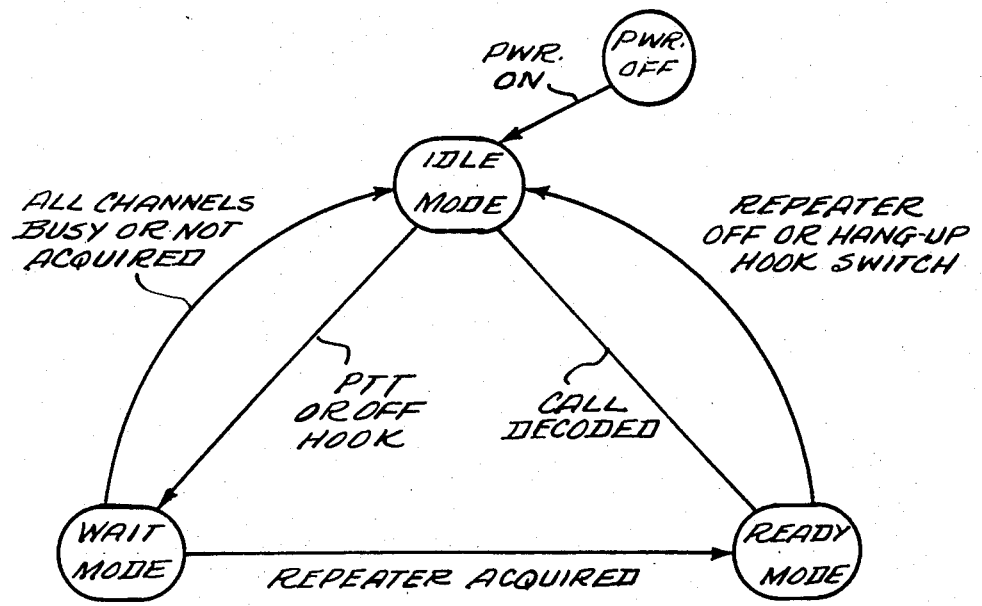
FIG. 5 is a graphical representation of the various operating modes of the repeater trunking system according to the present invention.

FIGS. 4A through 4D show a detailed circuit diagram of our mobile station communication establishing arrangement of FIG. 2. FIGS. 4A through 4D form a single schematic diagram as shown in FIG. 5 which is a composite of FIGS. 4A—4D. For clarity, transmitter 11, receiver 12, and antenna 10 shown in FIG. 2 have been omitted from FIGS. 4 and 5. In FIG. 4, search generator 13; clock generator 16; tone encoders, decoders, and gates 18; operator controls and indicators 14; and sequence generator 17 are shown enclosed in respective dashed line rectangles. The remainder of the circuit outside these rectangles comprises the control circuit 15. The circuit shown in FIG. 4 includes four types of logic gates, namely an OR gate such as G1, a NOR gate such as G2, and AND gate such as G3, and an inverter such as I1. As known in the art, an OR gate produces a logic 1 at its output in response to any of its inputs being at a logic 1, and produces a logic 0 at its output in response to all of its inputs being a logic 0. A NOR gate produces a logic 0 in response to any of its inputs being at a logic 1, and produces a logic 1 in response to all of its inputs being at a logic 0. An AND gate produces a logic 0 in response to any of its inputs being at a logic 0, and produces a logic 1 in response to all of its inputs being at a logic 1. An inverter simply produces the logic inversion of the signal applied to its input. In this circuit, it is assumed that a logic 1 is a positive voltage $+V$, and that a logic 0 is zero volts or ground. However, other voltages may be utilized for the logic 1 and logic 0 levels.

The circuit shown in FIGS. 4 and 5 utilizes a number of bistable flip-flops, such as the flip-flop FF1. Flip-flop FF1 produces a logic 1 at its Q output and a logic 9 at its $\overline{Q}$ output in response to a logic 1 being momentarily applied to its set input S; and produces a logic 0 at its Q input and a logic 1 at its $\overline{Q}$ input in response to a logic 1 being momentarily applied to its reset input R. The circuit utilizes a timer T1 which is normally reset to produce a logic 0 at is Q output. When timer T1 is set in response to a logic 1 being applied to its set input S, it produces a logic 1 at its Q output for a predetermined time (approximately 0.5 seconds in a preferred embodiment). After the predetermined time expires, the timer T1 resets so that its Q output produces a logic 0.

Clock generator 16 includes a pulse oscillator that produces logic 1 pulses of approximately 10 milliseconds duration approximately every 90 milliseconds.

Sequence generator 17 includes a seven stage shift register SR1 having a clock input C and a reset input R. When shift register SR1 is in an initial or reset condition, a logic 1 is present in stage 1, and all other stages are at a logic 0. This logic 1 is sequentially coupled through the subsequent stages 2 through 7 in response to clock signals. The stages may include a number of substages, depending upon the timing function required for a given stage.

In the preferred embodiment for a five channel system stage 1 has one substage; stage 2 has one substage, stage 3 has one substage, stage 4 has six substages; stage 5 has five substages; stage 6 has two substages and stage 7 has one substage. This is a total of 17 substages which, for a clock pulse rate of 90 milliseconds, requires about 1.53 seconds for one sequence through the shift register SR1. Stage 4 preferably has a period sufficiently long so that each receiver in a group has sufficient time to scan all channels for a group signal if it is present. Stage 6 preferably has a time period sufficiently long so that activation of the repeater can be determined. These times will be discussed in more detail subsequently. When the logic 1 reaches stage 7, it is fed back to the input for subsequent passage through the stages. In search generator 13, a five state counter is provided for the five to twenty channel frequencies. The counter produces a 5 bit BCD code which is decoded to produce the required channel frequency.

In tone encoders, decoders, and gates 18, there is provided four tone encoder-decoder circuits TC-1-TC-4, and one decode only TC-5. Each of these circuits includes a decoder portion having a tone input I coupled to the audio output of receiver 12. The decoder portion includes a filter and produces a logic 1 at its Q output in response to a signal of predetermined frequency. While we have shown the circuits TC-3, TC-4 with their Q outputs applied to an OR gate G11, the Q outputs could also be switched for individual selection by another section of a switch 46. Each of the circuits TC-1-TC-4 also includes an encoder portion which produces a particular signal frequency depending upon the intended function of the signal. For the busy signal, a relatively high audio frequency of 3000 Hertz is preferred, since the higher frequency passes through filters and operates more quickly. The group and subgroup signals may be any suitable frequency, but are preferably in the voice range of audio frequencies transmitted, namely between about 400 and 3000 Hertz. Each of the circuits TC-1-TC-4 acts as an encoder in response to a logic 1 applied to a control input C, and acts as a decoder in response to a logic 0 applied to its control input.

The outputs of the encoder portions of the circuits TC-1-TC-4 are selectively applied through switches S4 through S7 to an amplifier 51. The output of this amplifier 51 is coupled to transmitter 11 for modulating the transmitted signals in accordance with its output signal. In tone encoders, decoders, and gates 18, are provided a tone burst generator 50 which, along with a ready lamp 41, provide a short audible indication to the user that he has received a call, or that he has enabled the repeater to transmit.

In the circuit, there is utilized a plurality of switches S1 through S7 indicated by a switch arm contained in a rectangle. Because the circuit operates with logic level signals, switches S1 through S7 must be fast operating, so that we prefer to use a switching device such as an FET transistor. Each of switches S1 through S7 responds to a logic signal applied to a lead indicated as a dashed line in contact with the switch arm. Each switch opens its switch path in response to a logic 0, and provides a closed path in response to a logic 1.

In the operator controls and indicator 14, we provide a wait lamp 40 to indicate to a user that his mobile station is scanning for a vacant channel in call originate mode; a ready lamp 41 to indicate to an operator that his control arrangement has enabled the transmitter and receiver for operation; a microphone 42 for transmitting voice signals; a microphone push-to-talk button 43 to key or energize the transmitter for transmission; a loudspeaker 44 for hearing received audible signals; a microphone hook switch 45 having an on hook position when the microphone 42 is placed on the switch 45, and an off hook position when it is removed from the switch 45; and finally a subgroup selector switch 46 if subgroup signals are utilized. We also provide a notch filter F1 coupled between the receiver audio output and the loudspeaker switch S2 to remove the busy signal (preferably 3000 Hertz) which would otherwise be heard by a mobile station user. If desired, microphone 42 and loudspeaker 44 may be replaced by other devices, such as a telephone handset which can be placed on the hook switch 45.

When a user is in his mobile unit and is expecting to be called at any time, he places his station in the idle mode by turning his mobile station on. This provides power to our arrangement, and the voltage +V is applied as a logic 1 through the on hook contact of the switch 45, capacitor C5 and gate G1 to reset flip-flops FF1, FF3 if they are not already reset, and through capacitor C1 and OR gate G16 to reset flip-flop FF2 if it is not already reset. However, the transmitter is not keyed or radiating, and the mobile antenna is connected to the receiver. If conditions require distinction among mobile stations within the same group, subgroup signals (one for each desired subgroup) can be provided. In FIG. 4, it is assumed that there are two subgroups available, and that the station shown is in subgroup 1. Hence, the switch arm of subgroup selector switch 46 is shown connected to subgroup contact 1. This connects tone circuit TC-3 for subgroup 1 into the circuit, and disconnects tone circuit TC-4 for subgroup 2 from the circuit. In the idle mode, the reset flip-flop FF1 Q output is at a logic 1 and its $\bar{Q}$ output is at a logic 0. Flip-flop FF3 is also reset so that its Q output is a logic 0. This causes an AND gate G18 to produce a logic 0 and prevents clock pulses from being applied to shift register SR1 within sequence generator 17.

If no signal is present, a sensor, such as busy tone decoder TC-1, coupled to gate G19 is at a logic 0. This sensor may detect a carrier signal, or busy signal, or group signal as desired. We prefer that the sensor detect the busy frequency. The logic 0 produced by SR1 causes tone circuits TC-2, TC-3, TC-4 to decode. The output of the OR gate G22 is a logic 0 which causes tone circuit TC-1 to also decode. But if no tones have been received at this time, the Q outputs of the decoders TC-1, TC-2, TC-3, TC-4 are at a logic 0. Hence, the flip-flop FF4 produces a logic 0. Flip-flop FF2 is also reset so that its Q output is at a logic 0 and its $\bar{Q}$ output is at a logic 1. Under this condition, all inputs to the NOR gate G2 are at a logic 0 so that gate G2 produces a logic 1. This logic 1 permits the AND gate G6 to pass the logic 1 clock pulses as they are produced by generator 16. These clock pulses are passed by the AND gate G6 to the clock input C of search generator 13. This causes a BCD code to be generated at the five outputs of search generator 13. This BCD code, when decoded, controls the oscillator frequency in both the transmitter and receiver of the mobile station so that the transmitter and receiver are tuned to the frequencies F1R and F1T, F2R and F2T, F3R and F3T, F4R and F4T and F5R and F5T in sequence.

If a busy signal is present, the busy signal decoder TC-1 produces a logic 1 at its Q output. If a proper group tone is also detected, the group tone decoder TC-2 produces a logic 1 at its Q output. This logic 1 is held sufficiently long by FF4 (timed by timer T1) for detection of the subgroup 1 signal. With receipt of the busy signal and group signal, tone decoder TC-2 produces a logic 1 at its Q output, causing NOR gate G2 to produce a logic 0. This logic 0 at gate G2 prevents clock pulses from passing through the AND gate G6 so that search generator 13 is held in its present state which activates the receiver oscillator (and also the transmitter oscillator) associated with the channel frequency on which the busy and group signals were detected. If the proper subgroup 1 signal is detected, then the tone decoder TC-3 produces a logic 1 at its Q output. This logic 1 is passed by OR gate G11. When the decoders TC-1, TC-2, TC-3 simultaneously produce a logic 1, an AND gate G12 produces a logic 1 which is passed by an OR gate G13 to set flip-flop FF2. When flip-flop FF2 becomes set, its Q output supplies a logic 1 which causes NOR gate G2 to continue producing a logic 0 that blocks the clock pulses in AND gate G6. This logic 1 from the Q output of the flip-flop FF2 closes switches S1, S2, and S3. Closed switch S1 connects microphone 42 to the transmitter; closed switch S2 connects the loudspeaker 44 through the filter F1 to the receiver audio output; and closed switch S3 connects the push-to-talk button 43 to an OR gate G14 for keying the transmitter. The logic 1 from the Q output of the flip-flop FF2 also turns on the ready lamp 41 and energizes a tone burst generator 50 (connected to the loudspeaker 44) to indicate to the operator that he is receiving a call and switches a busy tone attenuator 101 into the busy tone encode (the busy tone deviation is reduced in ready mode since voice must be transmitted with busy tone) line. The transmitter and receiver of the mobile unit are tuned to the proper transmit and receive frequencies for communicating with the repeater to other mobile units in the group.

The user responds by removing his microphone 42 from the hook switch 45, or if his microphone 42 is already removed, the switch 45 supplies a plus voltage or logic 1 to the off hook contact. A busy signal from a repeater, as detected by busy tone decoder TC-1 or by the encode control line to busy bone decoder TC-1 keeps a busy tone counter 103 reset via a gate G-40 thereby causing a logic "0" at its Q output. Hence, flip-flop FF2 remains in the set condition. When the operator wishes to talk, he depresses his microphone push-to-talk button 43 which provides a logic 1 through closed switch S3 to OR gate G14 to key the transmitter and cause it to radiate and to cause antenna relay 19 (see FIG. 2) to switch to the transmitter position. Each time push-to-talk button 43 is depressed, a logic 1 is applied to OR gate G14 to cause a busy signal to be transmitted so as to keep the repeater timer 35 (see FIG. 3) producing an enabling signal. Upon release of the push-to-talk button 43, the transmitter is unkeyed and antenna relay 19 switches to the receive position so that the operator can hear signals from his loudspeaker 44.

The user remains on the channel as long as there is activity. When transmissions cease, the Q output of the busy tone decoder TC-1 becomes a logic 0. This permits busy tone counter 103 to count a logic 1 that is passed by the OR gate G16 to reset the flip-flop FF2. This causes the NOR gate G2 to produce a logic 1 that permits the gate G6 to pass clock pulses to the search generator 13. Hence that user's receiver returns to the idle mode and scans.

Or when the user is finished communicating, he places his microphone 42 back on hook switch 45. This causes a plus voltage or logic 1 to be applied to the on hook contact. This logic 1 is momentarily passed by a capacitor C1 through OR gate G16 to reset flip-flop FF2. When flip-flop FF2 is reset, its Q output returns to a logic 0. The logic 1 from the on hook contact is also momentarily passed by the capacitor C5 and the OR gate G3 to reset the flip-flops FF1, FF3 if they are not already reset. Removal of the busy signal causes flip-flop FF2 to produce a logic 0. Hence, NOR gate G2 produces a logic 1 that permits clock pulses to pass through gate G6 and cause the search generator 13 to begin searching once again.

In brief summary, when a mobile station is in the idle mode, search generator 13 scans until a signal is detected. If a busy signal and the proper group and subgroup signals are received, scanning stops, and an indication is provided to alert the user of a call.

The following description relates to the call originate mode. Once again, it is assumed that the mobile station is using a group signal and is in subgroup 1, and that the subgroup 1 signal has been selected by the subgroup selector switch 46 engaging contact 1 for connecting the tone circuit TC-3 into the circuit. Search generator 13 is scanning the channels. The user may initiate the call originate mode by either momentarily depressing his push-to-talk button 43 or by removing his microphone 42 from the microphone hook switch 45. Either action causes a call-originating command signal such as a positive voltage or logic 1 to be momentarily applied by capacitors C2 or C3 to an OR gate G17. This logic 1 is applied to the AND gate G3 along with the logic 1 from the Q output of the reset flip-flop FF2. AND gate G3 produces a logic 1 that sets the flip-flop FF1 and places it in the call originate mode. The Q output of the flip-flop FF1 switches to a logic 1 which turns on the wait lamp 40 to indicate to the operator that he must wait until a channel is established. A $\overline{Q}$ output of flip-flop FF1 at logic "0" is applied to the reset input R of a programmable counter 60. Programmable counter 60 allows sequence generator 17 to run through its entire sequence for each channel. If proper communication is not established after one sequence per channel, programmable counter 60 causes its Q output to produce a logic 1 that resets the flip-flop FF1 to the idle mode. The logic 1 from the Q output of the set flip-flop FF1 is also applied to an AND gate G4 along with whatever logic is being produced by the inverter I1. If, at the time the user switched to the call originate mode, his search generator 13 was on a busy channel, the receiver signal sensor produced a logic 1 which was inverted to a logic 0 so that gate G4 produces a logic 0. This permits the search generator to continue until an idle channel is found (indicated by lack of a carrier or by the lack of a busy signal), and the receiver signal sensor produces a logic 0. This logic 0 is inverted to a logic 1 by an inverter I1 so that gate G4 produces a logic 1. This logic 1 sets flip-flop FF3 and its Q output produces a logic 1 for the remainder of the call originate sequence. This logic 1 from flip-flop FF3 causes NOR gate G2 to produce a logic 0 so that gate G6 prevents the clock pulses from reaching search generator 13 for the remainder of the call originate sequence. The logic 1 from the flip-flop FF3 is applied to AND gate G18 to permit the clock pulses from clock generator 16 to be applied to the clock input of shift register SR1. Shift register SR1 was previously reset so that the circulating logic 1 was in stage 1. Logic 1 signals produced by the SR1 stages 2,4 and 5 places tone circuits TC1, TC2, TC3, or TC4 in the encoding mode.

In the call originate sequence, clock pulses are passed by the gate G18 to cause the logic 1 to shift from stage 1 to stage 2 of shift register SR1. This logic 1 is applied by an OR gate G22 to the control input of switch S4 and also to tone circuit TC-1 to switch it to the encoding mode. Tone circuit TC-1 produces a busy tone of 3000 Hertz which is passed by switch S4, amplified by tone amplifier 51, and applied to the mobile transmitter 11. The logic 1 in stage 2 is also passed by OR gate G14 to key the mobile transmitter 11 so that the busy signal is transmitted to the repeater. As mentioned before, the repeater transmitter 33 of FIG. 3 is enabled by receipt of this busy signal, and transmits a new busy signal on the selected channel to mobile stations. After the appropriate number of clock pulses, the logic 1 in stage 2 is then transferred to stage 3 of shift register SR1. This transfer opens the switch S4 and removes the busy signal. This activates an acquisition tone decoder TC-5. If an acquisition tone is not detected, then its $\overline{Q}$ output is logic "1". This "1" at G44 resets SR1 to State 1 thru G20 and flip-flop FF-3 through gate G42. The search generator advances to the next idle channel and SR1 starts over. This continues until an acquisition signal is found or until counter 60 causes the station to go into idle mode. If an acquisition tone is located, then shift register SR-1 shifts to its fourth step. The transferred logic 1 in stage 4 again passes through the gate G14 to key mobile transmitter 11. The logic 1 is also applied to the switch S5 associated with the tone circuit TC-2. Tone circuit TC-2 is in the encoding mode. When the switch S5 is closed, the group signal (for example a tone of 1050 Hertz) produced by the encoding tone circuit TC-2 is applied to the tone amplifier 51 and keyed transmitter 11 which transmits this group signal to the repeater which retransmits it to the mobile stations. The logic 1 is held in stage 4 for a sufficient length of time to permit all of the search generators in the other mobile stations to pass through all five channels of their search generator since it is possible that a search generator could have just left the acquired channel at the time communication was being established. Those stations in the designated group begin to respond.

After a suitable number of clock pulses, the logic 1 in the shift register SR1 is shifted from state 4 to stage 5. This transfer terminates the group signal provided by the encoder in tone circuit TC-2. The logic 1 in stage 5 is passed by gate G14 to key the mobile transmitter 11. This logic 1 is also coupled through subgroup selector switch 46 and its contact to close the switch S6. (If selector switch 46 had been in position 2, the logic 1 from stage 4 would have been applied to the switch S7.) The tone from the subgroup signal circuit TC-3 (for example a 400 Hertz tone) is passed by the switch S6 to tone amplifier 51 and applied to transmitter 11 which is keyed and transmits the tone to the repeater which re-transmits it to the other mobile stations.

After a suitable number of clock pulses, the logic 1 is shifted from stage 5 to stage 6 of shift register SR1. This transfer terminates the subgroup signal provided by the encoder of tone circuit TC-3. Under this condition, no logic 1 is applied to the gate G14, so that the mobile transmitter 11 becomes unkeyed. At this time, both inputs to the OR gate G22 are at a logic 0, and this logic 0 causes the busy tone circuit TC-1 to switch to the decode mode. Since the transmitter is unkeyed, the receiver is enabled, and is listening on the selected channel. The repeater should have been enabled and keyed by this time, and busy signal should be present on the channel. If busy tone is present, and received by the call originating mobile, the tone causes the decoder of tone circuit TC-1 to produce a logic 1 at its Q output. This logic 1, along with the logic 1 from stage 6 of shift register SR1, is applied to an AND gate G23 to cause gate G23 to produce a logic 1. This logic 1 is applied through OR gate G1 to the reset input R of the flip-flop FF1 to reset that flip-flop, and stop the calling sequence. Resetting of the flip-flop FF1 extinguishes wait lamp 40. This logic 1 from the gate G1 also resets the flip-flop FF3, and its Q output switches to a logic 0 to prevent any further clock pulses from passing through AND gate G18. This logic 1 from the gate G1 passes through an OR gate G20 to reset the shift register SR1. The logic 1 from the gate G23 is also applied through the OR gate G13 to set flip-flop FF2. When flip-flop FF2 becomes set, its Q output switches to a logic 1 which turns on the ready lamp 41, closes switches S1, S2, S3, and energizes tone burst generator 50 so that the user is alerted that he has obtained a channel. The closed switches S1, S2, S3 connect the speaker 44 to the receiver 12, and connect microphone 42, and push-to-talk button 43 through the gate G14 to the transmitter 11. With flip-flop FF2 held in the set condition, its Q output of a logic 1 insures that the gate G2 produces a logic 0 so that clock pulses cannot be applied to search genertaor 13, and cause the established channel to be switched. Each time the operator depresses his push-to-talk button 43, the logic 1 produced passes through the OR gate G22 to cause the tone circuit TC-1 to supply busy signal to the mobile transmitter 11. The attenuator 101 in the busy tone output reduces the busy tone deviation to allow voice to also modulate the transmitter.

In the sequence above where a logic 1 was in stage 6 of the shift register SR1, if no busy signal had been detected by the decoder in the tone circuit TC-1, the flip-flop FF1 would have remained set, flip-flop FF2 would have remained reset, and the flip-flop FF3 would have remained set. This would permit gate G18 to pass another clock pulse and cause the logic 1 to be shifted from stage 6 to stage 7 which resets SR1 to state 1.

If a channel is successfully acquired, the operator can communicate. As mentioned earlier, because of the timer 35 provided at the repeater, it is necessary for a busy tone to be received by the repeater during the timing interval in order to retain acquisition of the channel. After the communication between two mobile stations through a repeater is ended, the control is restored to the idle by replacing the microphone on the hook switch 45. This causes a positive voltage or a logic 1 to be passed by capacitor C5 through the OR gate G1 to reset flip-flops FF1, FF3 (already reset) and passed by capacitor C1 through OR gate G16 to reset flip-flop FF2. Their Q outputs return to a logic 0. The group tone decoder in circuit TC-2 is producing a logic 0. Hence, all inputs to the gate G2 are at a logic 0 so that gate G2 produces a logic 1 to permit clock pulses from the generator 16 to be passed by the gate G6 to the search generator 13. In the event the mobile operator neglects to hang up the microphone 42 after a communication has ended and return his radio to the idle mode, a logic "1" from busy tone circuit TC-1 keeps busy tone counter 103 reset. Once the repeater has timed out, the busy signal drops off of the channel and a logic "0" appears at the Q output of TC-1. Busy tone counter 103 counts for approximately one second and provides a logic "1" at its Q output to reset flip-flop FF2, returning the station to the idle mode.

A logic "1" is fed back from stage 7 of shift register SR1 to gate G20 and to a gate G42 to reset shift register SR1 and flip-flop FF-3. The channel selection advances for each clock pulse coupled to search generator 13. Upon receipt of further clock pulses, the sequence described above and starting at stage 1 is repeated. The sequence will continue until the channel counter reaches 5 (this case) or if, when the logic 1 reaches stage 6, a busy tone is heard from the repeater, then flip-flop FF2 becomes set and flip-flop FF1 becomes reset to provide the user an indication that he has acquired a channel. He should take his microphone 42 off hook before the timer in the repeater times out (approximately 10 seconds) and resets.

The operation of the repeater trunking system will be further explained in terms of its various operating modes.

Referring now to FIG. 5, there is shown a pictorial diagram indicating the various modes of operation of the repeater trunking system according to the present invention. The "call originate" and "idle" modes are further broken down into the functional modes "idle", "wait" and "ready". When power is initially applied, a mobile station is placed in the idle mode. In the idle mode, a mobile station scans all channels for a call identifying a particular group with which it is associated. All audio circuits are inhibited in this mode so that the user is undisturbed. If a call is decoded indicating that a particular mobile station is within a group being called, that mobile station is placed in the ready mode.

In the ready mode, the mobile station is locked onto a channel and ready to communicate. The audio circuits are enabled and the ready lamp 41 is on. Alert Beeps (four) are sounded via speaker 44. If a repeater goes off the air or communication is otherwise interrupted, the mobile station will return to the idle mode from the ready mode (hook switch 45 hung-up at other mobile station).

From the idle mode, if push-to-talk button 43 is depressed, the mobile station will operate in the wait mode. Similarly, taking the microphone off of hook switch 45 will cause the station to enter the wait mode. In the wait mode, the station stops on the first idle channel and attempts to acquire the repeater. The station sends a busy signal to the repeater and waits to hear an acquisition signal. During this procedure, wait lamp 40 is on and the audio circuits are disabled. After all channels have been tried without acquiring a repeater, a single alert beep is heard via speaker 44.

If all channels are busy or if the mobile station has failed to establish communication with a repeater, the station returns to the idle mode. However, if a repeater is acquired, as indicated by the confirming hand shake of the acquisition signal transmitted by the repeater and received by the mobile station, the station proceeds to transmit the desired group signal. Flow charts indicating the function of the trunking system according to the present invention with respect to its various modes are shown in FIGS. 6, 7 and 8.

Figure 6:
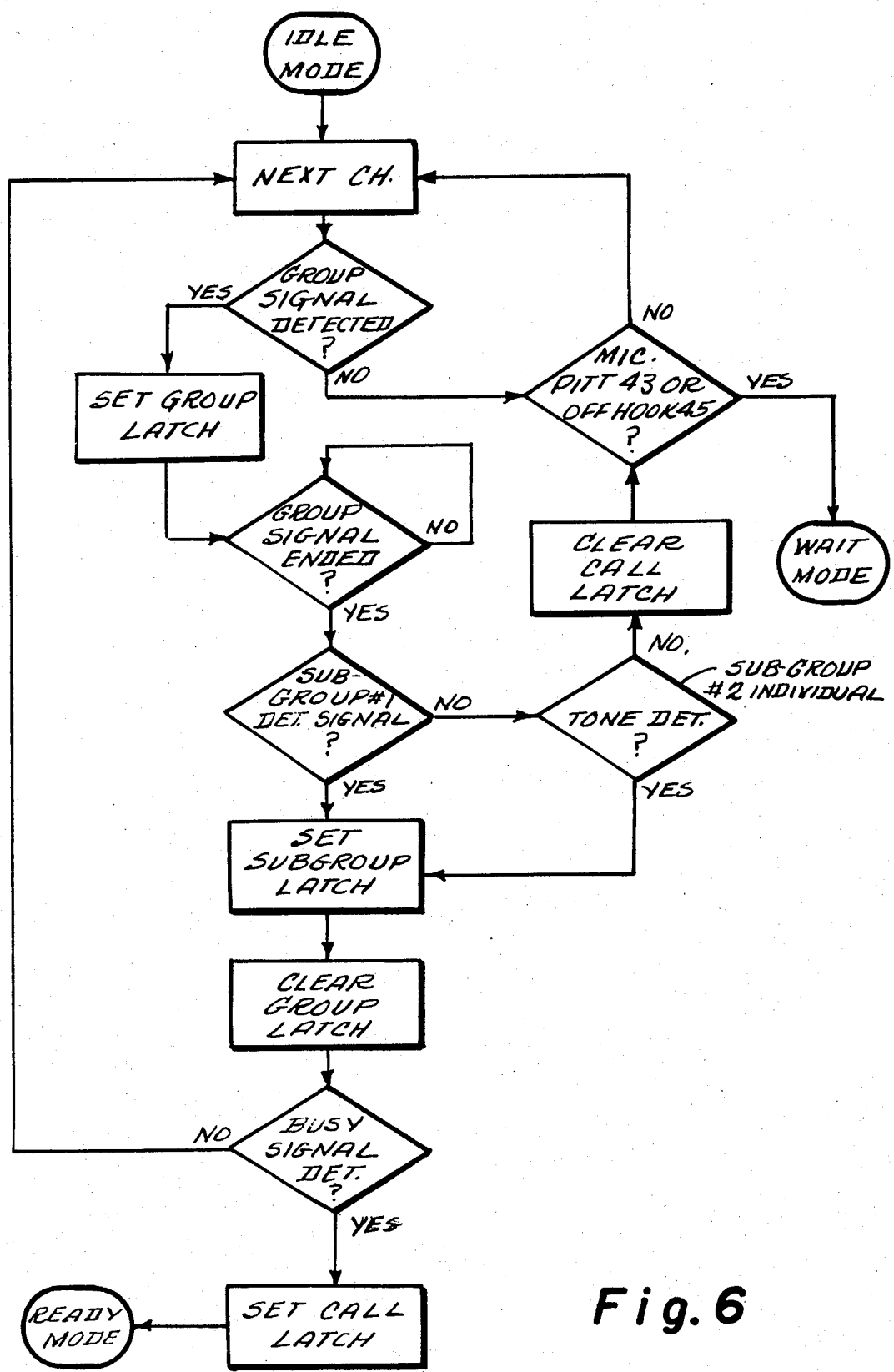
FIG. 6 is a flow chart showing the operation of the repeater trunking system in the "idle" mode.

Referring now to FIG. 6, there is shown a flow chart of the operation of the repeater trucking system according to the present invention operating in the idle mode. Operating in the idle mode, each of the channels is scanned so that a mobile station can determine whether its particular group signal is among any group signals being transmitted over any of the channels. If the particular group signal is not detected, this system determines whether microphone push to talk switch 43 or the off hook switch 45 has been activated. If either of these switches has been activated, this system goes into the wait mode. If neither of these switches has been activated, then the receiver listens to the next channel to determine whether the particular group signal is present.

Once a group signal for that particular mobile station has been detected, a group latch is set and the group signal is examined. When the group signal has ended, the receiver looks for a subgroup signal if subgroups and subgroup signals are being utilized. If the appropriate subgroup is detected a subgroup latch is set and the group latch is cleared. The receiver then listens for a busy signal transmitted by the repeater. If no busy signal is detected the receiver then tunes to the next channel and again listens for its particular group signal. However, if a busy signal is detected, then a call latch is set and the mobile station enters the ready mode to establish communication with the mobile station calling the group with which it is associated.

Figure 7:
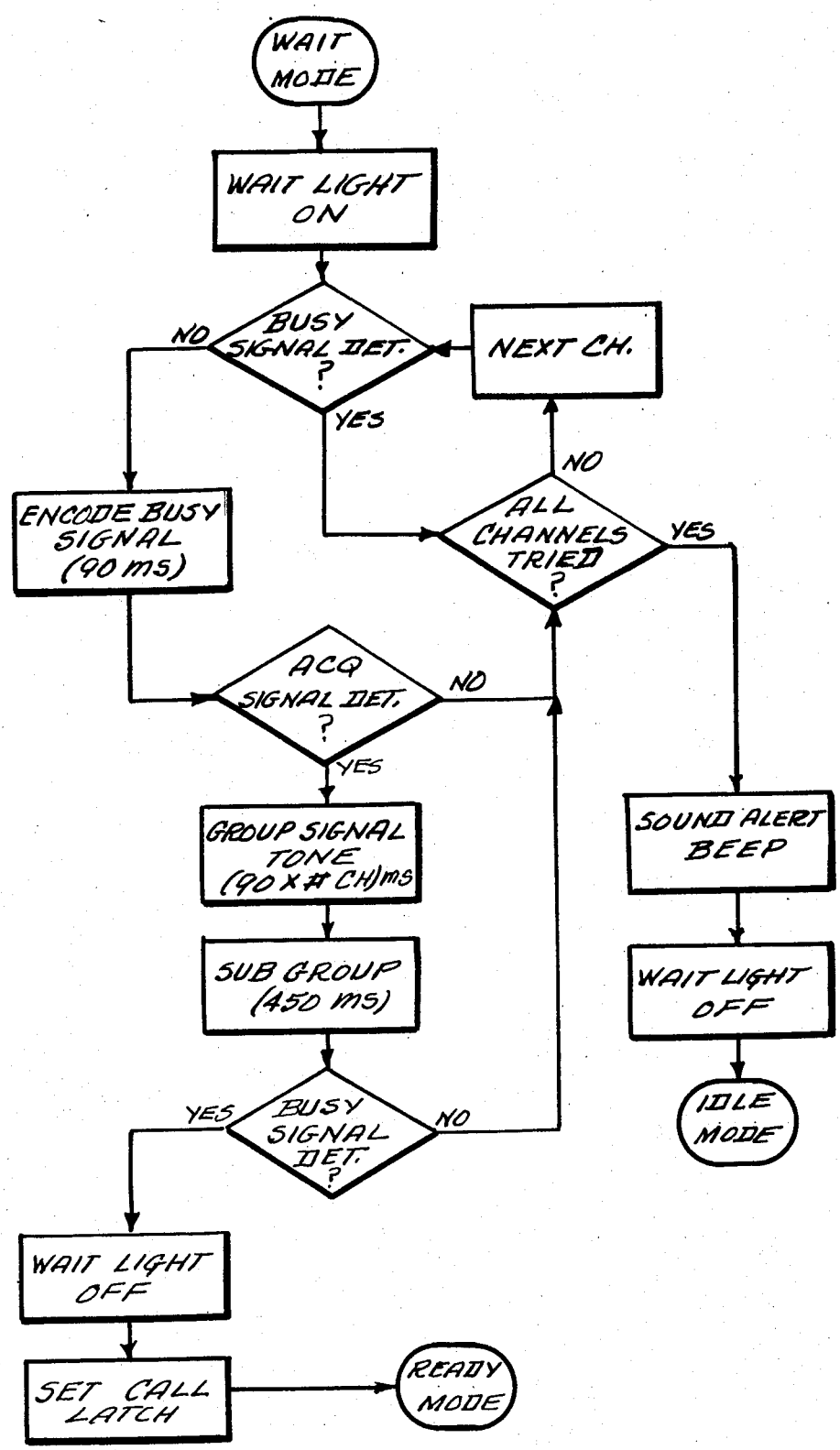
FIG. 7 is a flow chart showing the operation of the repeater trunking system in the "wait" mode.
Figure 8:
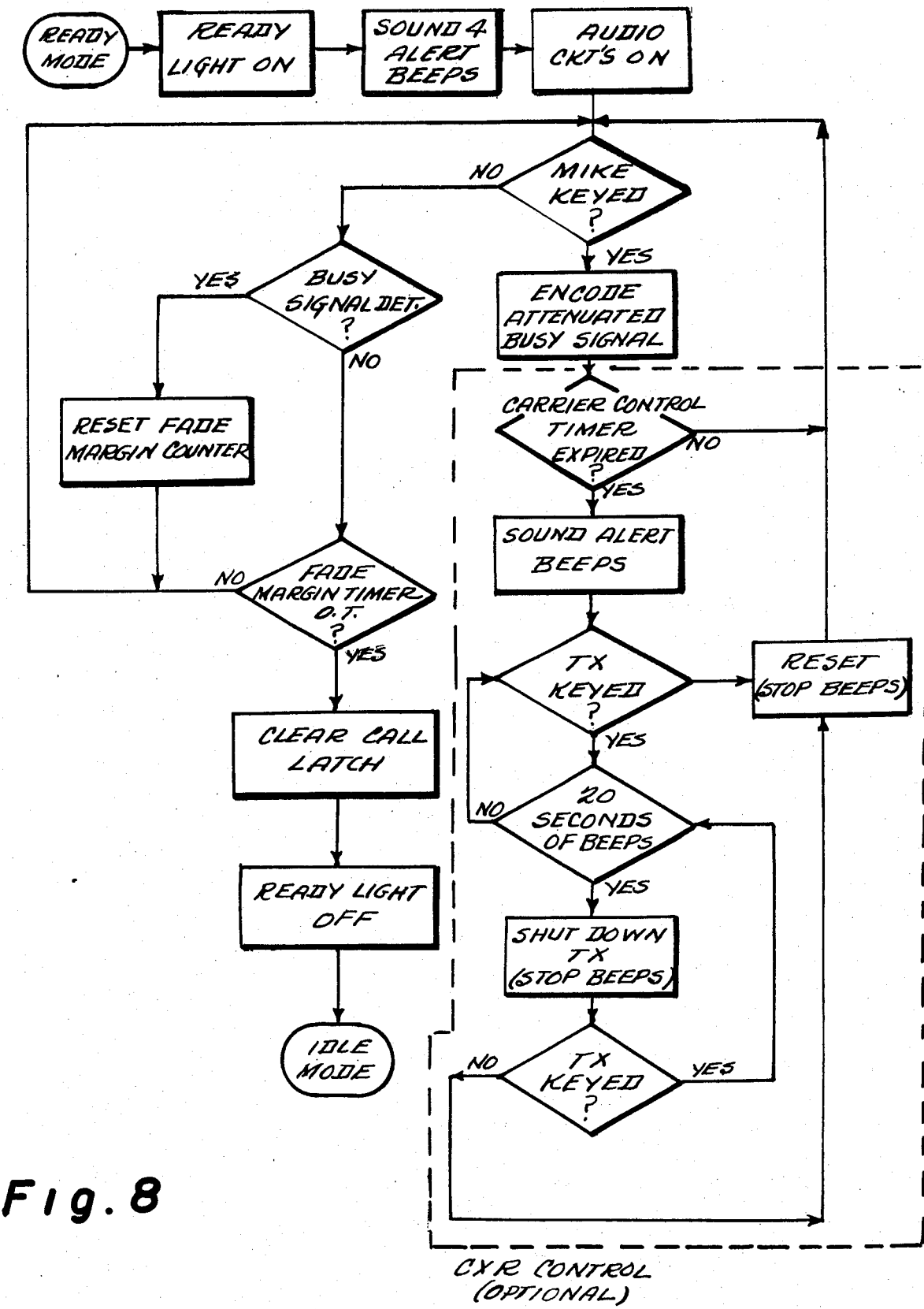
FIG. 8 is a flow chart diagram showing the operation of the repeater trunking system in the "ready" mode.

Referring now to FIG. 7, there is shown a flow chart illustrating the operation of the repeater trunking system in the wait mode. In the wait mode, wait lamp 40 is lighted. If a busy signal is detected, it is determined whether or not all channels have been tried, if not, the next channel in the sequence is listened to. However, if all channels have been tried a beep alert sounds through speaker 44 and wait light 40 is extinguished and the trunking system enters the idle mode. Whenever a busy signal is not detected, a busy signal is encoded and an acquisition signal is listened for. If an acquisition signal is present, then the group signal is encoded. After the group signal is encoded, the subgroup signal is encoded. After group and subgroup signals have been encoded, a busy signal is listened for. If the busy signal is present, wait lamp 40 is extinguished the call latch is set and the station enters the ready mode.

Referring now to FIG. 8, there is shown a flow chart illustrating the operation of the repeater trunking system in the ready mode. Operating in the ready mode, ready lamp 41 is lit and four alert beeps are sounded through speaker 44. All audio circuits are turned on. If the microphone push-to-talk switch 43 is keyed then attenuated busy signal is encoded. If the carrier control timer has timed out then an audio alert is sounded. If the transmitter is keyed and there are 20 seconds of audio alert, the transmitter is shut down.

After the audio circuits have been turned on, if a busy signal is detected, a fade margin counter is reset and it is again determined whether the microphone has been keyed. If the microphone has not been keyed and a busy signal has not been detected, it is determined whether the fade margin (no busy tone) timer has timed out. If it has timed out, the call latch is cleared, ready lamp 41 is extinguished and the station goes into the idle mode.

Figure 9:
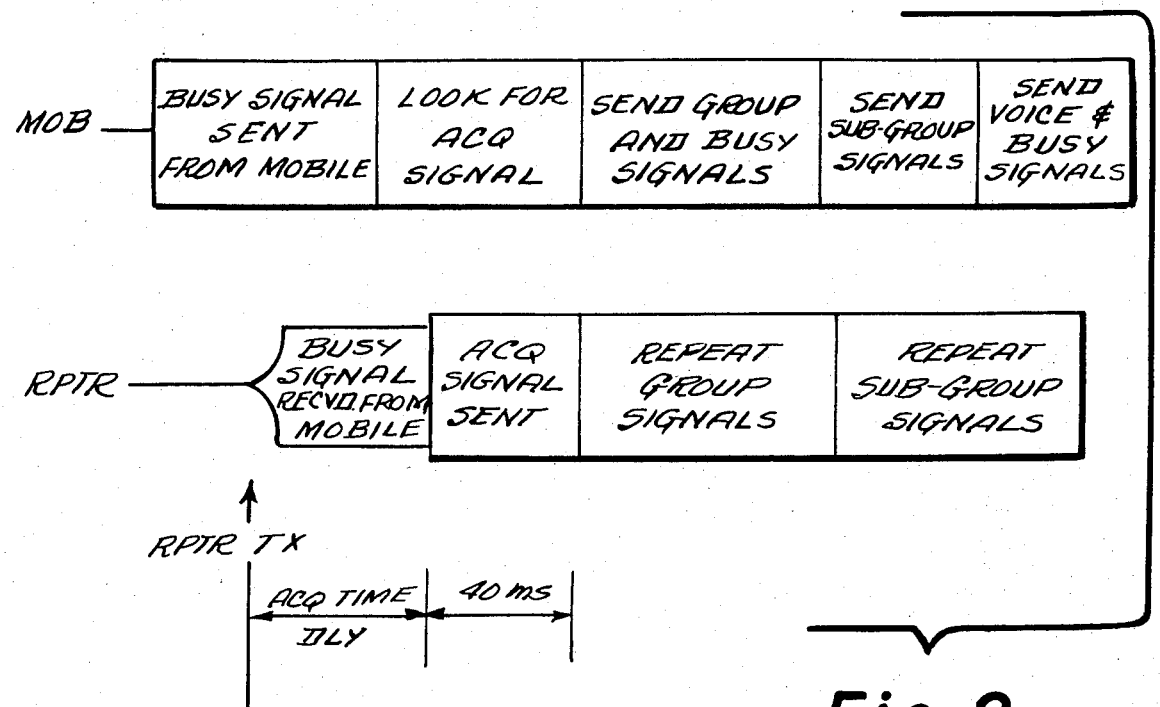
FIG. 9 is a diagram illustrating the acquisition signalling sequence between a mobile station originating a call and a repeater station.

Referring now to FIG. 9, there is pictorially illustrated the repeater acquisition sequence. This chart details the hand shake between a mobile station attempting to access other mobile stations within its group through a repeater. A mobile station first searches for a free channel and then transmits a busy signal. After it has sent the busy signal, the mobile listens on the channels on which the busy signal is sent for an acquisition signal. Upon receipt of the acquisition signal, the handshake has been effected and the mobile proceeds to send group, subgroup, and busy signals.

The repeater, when not in use, is listening for a busy signal. When a busy signal is received from the mobile, an acquisition signal is sent. Assuming the acquisition signal is followed by receipt of group, subgroup and busy signals being sent from the mobile, the repeater receives all of these signals and in turn retransmits the group and subgroup signals and regenerates and transmits a busy signal. This busy signal serves as notice to all other mobiles not in the particular group and subgroup defined that the repeater is in use so that they will not attempt to gain control of the repeater.

In brief summary, when a mobile or control station of the repeater trunking system is in the call originate mode, the shift register SR2 causes scanning until an idle channel is found. This causes the shift register SR1 to go through its sequence of causing the transmitter to send a busy signal, listen for an acquisition signal, and then send a group signal, and subgroup signal to activate the repeater and appropriate mobile stations. If the repeater is activated, an indication is provided to alert the user that he has acquired a channel, and should transmit within a predetermined time (10 seconds). If the repeater is not activated, the shift register SR1 goes through its sequence on the next channel, and so on through each channel until a channel is acquired, or until all channels have been sequenced. If no channel is acquired, the user can start the entire sequence over again and again.

It will thus be seen that there has been provided a new and improved control circuit and method for enabling the user of a mobile station to readily and quickly acquire a single unused radio frequency channel from a plurality of such channels for transmitting, or to be called on an available channel. The arrangement is relatively simple, and does not require extensive or complex circuits. While there has been shown only one embodiment of our invention, persons skilled in the art will appreciate the many modifications that may be made. For example, there has been shown a 5 channel system, but there may be almost any number of channels and repeaters. However, good trunking practice limits the channels to about 20. Different logic circuit arrangements and logic levels may be used, such as a microprocessor circuit. The various circuits may have almost any desired timing periods, particularly those in the shift register SR1 and in the timing circuit T1. The timers and counters may be in analog or digital form. These are matters of preference and expediency depending upon the particular communication conditions involved. If a system is free from radiation interference, the busy signal may be omitted and operation made dependent upon the proper carrier. Otherwise, it is preferred the the receiver signal sensor produce a logic 1 in response to a busy tone, and a logic 0 in response to the absence of busy signal. While we have shown one group circuit and two subgroup circuits, one of which is selectable, additional subgroups may be provided to provide further selection of the particular mobile units being called. Or, less subgroup circuits may be provided so that a more general or less select group of mobiles may be called. Or, group and subgroup signals may be transmitted simultaneously rather than sequentially, or may be frequency stepped functions of one common encoder and decoder. The arrangement may also be used directly between mobile stations without the use of the repeater. Persons skilled in the art will also appreciate that with a repeater transmitter frequency and a repeater receive frequency, only push-to-talk or simplex operation can be provided. However, additional frequencies or auxiliary equipment may be provided so that full duplex operation can be provided. Again, this is a matter of preference and frequency availability. While it is preferred that the busy signal and acquisition signal frequencies be above the audio frequency, for fast operation, the busy signal and acquisition signal may be almost any desired frequency or format. Likewise, the group and subgroup signals may be almost any desired frequency. However, we believe it preferable that the busy signal and acquisition signal be at a frequency just above the transmitted audio frequencies, and that the group and subgroup signals be in the band transmitted voice frequencies. This present no problem, since the group and subgroup tones are transmitted only when communication is being established. Therefore, while the invention has been described with reference to a particular preferred embodiment, it is to be understood that modifications may be made without departing from the spirit of the invention or from the scope of the claims.

We claim:

1. In a system including a plurality of radio stations capable of communicating with one another via an enabled one of a plurality of repeaters, each repeater operating on a different channel wherein the channels being used are indicated by the presence of a marker signal appearing thereon and the channels being unused are indicated by the absence of such marker signal, an improved method for automatically establishing a dedicated communication channel between a call-originating first radio station and a call-receiving second radio station on a presently unused channel in response to a call-originating command signal generated at the first radio station, said method comprising the steps of:
   automatically scanning by the first radio station of the plurality of channels to select an unused unmarked channel in response to said call-originating command signal; and
   automatically exchanging signals on the thus selected channel between the first radio station and the repeater associated with the selected channel to enable the repeater on the selected channel, the exchanging of signals including (1) transmitting a busy signal from the first radio station, (2) receiving the busy signal at the thus selected repeater, (3) transmitting by the thus selected repeater of an acquisition signal different from the busy signal, and (4) receiving the acquisition signal at the first radio station, and only thereafter dedicating the thus selected repeater for communication between the first and second radio stations in response to successful completion of the entire exchanging step.

2. A method for establishing communication according to claim 1 wherein the step of scanning includes scanning the plurality of channels in a predetermined sequence beginning with a randomly selected channel.

3. A method for establishing communication according to claim 1 wherein the step of scanning includes scanning the plurality of channels in a predetermined sequence beginning with a predetermined one of said channels.

4. A method for establishing communication according to claim 1 wherein the step of scanning includes scanning the plurality of channels in a random sequence beginning with a randomly selected channel.

5. A method for establishing communication according to claim 1 wherein the step of scanning includes scanning the plurality of channels in a random sequence beginning with a predetermined one of said channels.

6. An arrangement for dedicating a communication channel between first and second radio stations through one of plural repeaters, each repeater being capable of relaying radio-frequency communications on a respectively corresponding communications channel, said arrangement comprising:
  means at the first radio station responsive to a call-originate command for locating an unused one of the communication channels;
  means at the first radio station for transmitting a busy signal to the corresponding repeater on the located unused channel;
  means at the repeater for receiving the busy signal transmitted by the first radio station and for transmitting in response thereto an acquisition signal different from the busy signal on the located channel; and
  means at the first radio station for receiving the acquisition signal transmitted by the repeater and generating and transmitting, in response thereto, a group signal on the located channel identifying a predetermined set of radio stations including the second radio station; and
  means at the second radio station for receiving, via the repeater, the group signal, thereby dedicating a communication channel between the first and second radio stations via the repeater.

7. An arrangement according to claim 6 further including means at the repeater for transmitting a busy signal.

8. An arrangement according to either claims 6 or 7 wherein the means for locating an unused one of the communication channels comprises:
  means for scanning the communication channels; and
  means for stopping the scanning on a channel not having a predetermined signal thereon.

9. An arrangement according to either of claims 6 or 7 further including:
  means at the second radio station for scanning the communication channels;
  means for stopping the scanning in response to the detection by the second radio station of the group signal; and means for establishing communication between the first and second radio stations through the repeater on the located channel.

10. In a system including a plurality of radio stations capable of communicating with one another through a repeater system operable on a plurality of channels, an improved method for establishing communication between a first radio station and a second radio station comprising the steps of:
  exchanging signals on a first channel between the first radio station and the repeater system enabling the repeater on the first channel and dedicating that first channel of the repeater system for communications between the first and second radio stations in response to successful completion of the exchanging step;
  repeating the exchanging step on a second channel in response to unsuccessful completion of the first exchanging step and continuing to attempt to exchange signals on each of the plurality of channels until a successful exchange has been completed;
  after a successful exchange of signals between the first radio station and the repeater system on one of the plurality of channels, transmitting from the first radio station a signal for identifying the second radio station;
  receiving at the second radio station the identifying signal transmitted by the first radio station and thereafter communicating between the first and second radio stations through the repeater system on the channel over which a completed exchange of signals between the first radio station and the repeater system took place.

11. A method for establishing communication according to claim 10 wherein the step of receiving at the second radio station includes scanning by the second radio station of the plurality of channels and stopping the scanning in response to the detection of the identifying signal.

12. An arrangement for dedicating a communication channel over one of a plurality of radio frequency channels between a first one of a plurality of radio stations and a second one of the plurality of radio stations through a repeater station, the arrangement comprising:
  first means for placing the second station in an idle mode and for causing the second station to scan the radio frequency channels;
  second means coupled to the first means for stopping the scanning in response to a predetermined group signal on a selected one of the channels, and enabling the second station to be operated on the selected channel in response to the predetermined group signal thereon so as to communicate with the first station on the selected channel;
  third means for placing the first station in a call originate mode and for causing the first station to scan the radio frequency channels;
  fourth means coupled to the third means for stopping the scanning on a non-busy channel in response to the absence of a busy signal on one of the plurality of radio frequency channels, and for enabling the first station to be operated on the non-busy selected channel in response to the absence of a predetermined busy signal thereon; and
  means, within the repeater, for receiving on an unused channel, a busy signal and transmitting on that unused channel in response thereto an acquisition signal;
  fifth means coupled to the fourth means for causing the enabled first station to transmit the busy signal on said selected channel to the repeater to operate the repeater, and for causing the first station to listen for an acquisition signal transmitted by the operated repeater on said selected channel, the successful exchange of busy and acquisition signals between the first station and the repeater being required for dedicating the selected channel for communication between the first and second stations by subsequent transmission of station selection signals from said first station through said repeater.

13. The arrangement according to claim 12 wherein the operated repeater transmits the acquisition signal on the one selected channel in response to receiving the busy signal from the first station.

14. An arrangement according to either of claims 12 or 13 wherein the fifth means further includes means for causing the enabled first radio station to transmit a predetermined group signal.

15. An arrangement for dedicating one of a plurality of two-frequency radio communication channels for communication between a first radio station and a second radio station through a repeater, said arrangement comprising:
   a repeater which repeats information transmitted thereto on a first frequency of a two-frequency radio channel and re-transmits the information on a second frequency of the two-frequency radio channel, the repeater being activated by receiving a busy signal and transmitting in response thereto an acquisition signal;
   first means for placing the first station in an idle mode and for causing the first station to scan the radio frequency channels, to stop scanning in response to a predetermined group signal detected on one of the channels, and to arrange the first station to be operated on the one channel in response to the predetermined group signal; and
   second means for alternatively placing the first station in a call originate mode, the second means comprising:
   means for causing the first radio station to scan the radio frequency channels;
   means for stopping the scanning in response to the absence of a busy signal on one of the plurality of channels;
   means for enabling the first radio station and the repeater on the one channel in response to the absence of a busy signal thereon;
   means for transmitting a busy signal for operating the repeater on the one channel; and
   means for detecting an acquisition signal transmitted by the repeater, the acquisition signal being different from the busy signal.

16. An arrangement according to claim 15 wherein the second means further causes the operated first radio station to transmit the predetermined group signal to the operated repeater and wherein the operated repeater retransmits the predetermined group signal to the second radio station.

17. An arrangement for dedicating one of a plurality of radio channels communication between a first radio station and a second radio station, comprising:
   means for selectively placing the first station in either an idle mode or in a call originate mode;
   a search generator coupled to and responsive to said means for selectively placing being in the idle mode for causing the first radio station to be sequentially tuned through the plurality of radio channels and stopping the sequential tuning on a channel having at least one predetermined group signal thereon, and responsive to said means for selectively placing being in the call originate mode for causing the first radio station to be sequentially tuned through the plurality of radio channels to locate a channel having no busy signal thereon; and
   a sequential generator coupled to the means for selectively placing and to the search generator and responsive to the means for selectively placing being in the call originate mode for causing the first station to transmit a busy signal on the channel having no busy signal thereon, for thereafter causing the first radio station to be receptive on the channel, and for thereafter indicating in response to a received acquisition signal different from the busy signal received on said channel that the communication channel is dedicated for communication between the first and second radio stations.

18. An arrangement according to claim 17 further comprising a repeater radio station for operation on each of said plurality of radio channels, each repeater radio station operating to retransmit information transmitted thereto, after it has been dedicated to operate by receiving a busy signal transmitted thereto and transmitting in response to the busy signal, an acquisition signal.

19. An arrangement according to claim 18 wherein the received predetermined signal indicative of established communication comprises a continuous busy signal transmitted by the repeater radio station.

20. An arrangement for use with a first radio station to establish communication over a radio channel selected from a plurality of radio channels through a repeater to a second radio station, the arrangement comprising:
   a search generator for causing the first radio station to become tuned to each of the channels in a repetitive sequence;
   a sequence generator for providing the sequence of first causing the search generator to tune the first radio station to locate an idle channel, second causing the first radio station to transmit a busy signal on the idle channel, third causing the first radio station to listen for an acquisition signal transmitted by a repeater in response to reception by the repeater of the busy signal transmitted on the idle channel, fourth, causing the first radio station, in response to the acquisition signal to transmit a group signal identifying the second radio station on the idle channel, and fifth stopping the transmission and causing the first station to listen for a signal on the idle channel; and
   means coupled to the search generator for selectively causing the first radio station to become enabled for communication on a channel having a group signal thereon specifying a group to which the first station belongs, or for selectively causing the sequence generator to enable the first radio station for communication on the idle channel in response to reception of an acquisition signal on the idle channel during the listening in the sequence generator sequence.

21. The arrangement of claim 20 wherein said sequence generator sequence is repeated in response to the absence of a signal on the idle channel when the receiver of the first radio station listens on the idle channel.

22. A method for dedicating a channel for communication between a first radio station through a radio repeater and a second radio station over a radio channel selected from a plurality of such channels comprising the steps of:
   placing the first radio station in a call originate mode and scanning the plurality of channels until an idle channel without busy signal is located, and enabling the first station on the idle channel;
   transmitting by the first radio station a busy signal to the radio repeater to enable the radio repeater on the idle channel;

receiving by the radio repeater the busy signal transmitted by the first radio station;

transmitting by the repeater of an acquisition signal, different from the busy signal;

receiving at the first radio station the acquisition signal transmitted by the radio repeater;

transmitting by the first radio station in response to the acquisition signal at least one predetermined group signal to the radio repeater on the idle channel for retransmission by the radio repeater to enable the second radio station.

23. A method according to claim 22 further including the steps of:

scanning the plurality of channels by the second radio station in the idle mode until a predetermined group signal is located and enabling the second station on the channel having the predetermined group signal; and communicating by the first radio station with the second radio station through the radio repeater in response to the repeater transmitting the busy signal on the idle channel.

24. A method according to claim 23 further including in response to the failure of said radio repeater to transmit said acquisition signal on said idle channel, the steps of:

again transmitting by the first station the busy signal to the radio repeater to enable the radio repeater on another idle channel;

again listening for the acquisition signal transmitted by the repeater;

again transmitting by the first radio station in response to the acquisition signal the group signal to the radio repeater on the idle channel for retransmission by the radio repeater to enable the second station;

again receiving by the first radio station on the idle channel to determine whether the radio repeater is transmitting the busy signal on the idle channel; and communicating by the first radio station with the second radio station through the radio repeater in response to the radio repeater transmitting the busy signal, or resuming scanning said channels in response to the failure of the radio repeater to transmit the acquisition signal the idle channel.

25. A method for establishing radio communication from a first radio station through a radio repeater to a second radio station over a radio channel selected from a plurality of such channels comprising the steps of:

scanning by the first radio station the plurality of channels until an idle channel without busy signal is located, and enabling the first station on the idle channel;

transmitting by the first radio station a predetermined busy signal to the radio repeater to enable the radio repeater on the idle channel;

listening for an acquisition signal transmitted by the repeater in response to the busy signal transmitted by the first station;

transmitting by the first radio station at least one group signal to the radio repeater on the idle channel;

receiving by the first radio station on the idle channel to determine whether the radio repeater is transmitting the acquisition signal on the idle channel; and communicating by the first radio station with the second radio station through the radio repeater in response to the radio repeater transmitting the acquisition signal on the idle channel.

26. A trunking radio transceiver comprising:

a radio receiver for receiving both control and communication signals selectively over each of a plurality of channels;

a radio transmitter for transmitting both control and communication signals selectively over each of a plurality of channels; and a control unit, connected to control said receiver and transmitter, including means for operating the receiver and transmitter in both of the two following modes, operation occurring in either such mode, but not simultaneously:

(a) an idle mode where at least said receiver is repetitively scanned over said plurality of channels until a predetermined control signal is detected in one non-idle channel whereupon said scanning is interrupted and subsequent communication signal transceive operations are permitted on said one channel; or alternatively, (b) a call-originate mode where at least said receiver is scanned over said plurality of channels until an idle channel is detected whereupon, (1) said scanning is interrupted, (2) a first control signal is transmitted over said detected idle channel for a first predetermined time period, (3) a second control signal different from said first control signal is received and detected over said detected idle channel during a second predetermined time period, (4) at least one of said predetermined control signals thereafter continues to be transmitted over said detected idle channel to mark it as busy, and (5) communication signal transceive operations are permitted on said detected idle channel only if steps (2) and (3) are successfully completed.

27. A trunking radio transceiver including channel acquisition control means that, when in an idle mode, continuously and automatically scans for possible calling signals and busy-marking signals on each of plural channels and that, when in a call-originate mode, automatically scans for an idle unmarked channel in response to a call originate request signal and transmits a busy-marking signal to a repeater station over a detected previously unmarked idle channel and requires receipt of an answer-back acquisition control signal from the repeater station over that same channel before permitting transceive communication of information thereover via said repeater station, and wherein said channel acquisition control means comprises:

answer-back control means requiring receipt of an answer-back acquisition control signal from the repeater station but different in information content from said busy signal, before permitting said transceive communication of information via said repeater station.

28. A trunking radio communication system comprising plural remote transceivers and plural repeaters, at least one repeater being provided for each of plural available channels, said system comprising:

transceiver channel acquisition control means in each transceiver which sequentially (1) automatically scans to detect and select an unmarked "idle" channel in response to a call-originate command signal, (2) automatically transmits a first acquisition control signal over said selected channel, and (3) automatically permits transceive communications thereover only after successful receipt and detection on that channel of a second acquisition control signal different from said first acquisition control signal, and repeater channel acquisition control means in each repeater which (1) automatically detects said first acquisition control signal on its respective channel and in response, (2) automatically transmits said second acquisition control signal thereover only if its channel is truly in an idle status at that time.

29. A radio repeater for use on a given channel in a plural channel trunking radio communication system, said repeater comprising:

radio receiver means for receiving information signals on a dedicated radio receive carrier frequency;

radio transmitter means for automatically retransmitting said received information signals on a dedicated radio transmit carrier frequency; and channel acquisition control means which (1) automatically receives and detects a first acquisition control signal on said receive frequency of the channel a second acquisition control signal, different in information content from said first control signal only if its channel comprising said dedicated receive and transmit carrier frequencies is truly in an unmarked idle status at that time and (3) which thereafter continues to cause transmission of a control signal over said transmit frequency to mark the channel as busy.

30. A trunking radio transceiver comprising:

a radio receiver, a radio transmitter, and channel acquisition control means which (1) automatically scans to detect an unmarked "idle" channel comprising a dedicated receive carrier frequency and an associated dedicated transmit carrier frequency in response to a call-originate request signal, (2) automatically transmits a first acquisition control signal over the dedicated transmit carrier frequency of said detected channel, and (3) automatically permits transceive communications thereover only after successful receipt and detection on the dedicated receive carrier frequency of that same channel of a second acquisition control signal different in information content from said first acquisition control signal.

* * * * *

UNITED STATES PATENT OFFICE
CERTIFICATE OF CORRECTION

Patent No. 4,360,927           Dated November 23, 1982

Inventor(s) William A. Bowen and James W. Williams

It is certified that error appears in the above-identified patent and that said Letters Patent are hereby corrected as shown below:

Col. 6, line 50, cancel "9" and insert -- 0 --

Signed and Sealed this

First Day of February 1983

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,360,927

DATED : November 23, 1982

INVENTOR(S) : Bowen et al

It is certified that error appears in the above-identified patent and that said Letters Patent is hereby corrected as shown below:

Column 23, between lines 22 and 23 should be inserted:

--and, in response thereto, (2) automatically transmits over its channel--.

Signed and Sealed this

Seventeenth Day of June 1986

[SEAL]

*Attest:*

DONALD J. QUIGG

*Attesting Officer*  *Commissioner of Patents and Trademarks*